(12) United States Patent
Shibata

(10) Patent No.: US 7,103,120 B2
(45) Date of Patent: Sep. 5, 2006

(54) ADAPTIVE ANTENNA RECEPTION APPARATUS

(75) Inventor: Takayuki Shibata, Tokyo (JP)

(73) Assignee: NEC Corporation, Tokyo (JP)

( * ) Notice: Subject to any disclaimer, the term of this patent is extended or adjusted under 35 U.S.C. 154(b) by 804 days.

(21) Appl. No.: 10/157,063

(22) Filed: May 30, 2002

(65) Prior Publication Data

US 2002/0181629 A1 Dec. 5, 2002

(30) Foreign Application Priority Data

Jun. 1, 2001 (JP) .............................. 2001-167115

(51) Int. Cl.
*H04B 7/10* (2006.01)
*H04B 7/08* (2006.01)

(52) U.S. Cl. ...................................... 375/347; 455/132

(58) Field of Classification Search .............. 455/63.4, 455/25, 562, 132; 375/347, 147, 148, 267, 375/316, 130, 140, 144; 343/853; 342/372
See application file for complete search history.

(56) References Cited

U.S. PATENT DOCUMENTS

| | | | | |
|---|---|---|---|---|
| 6,018,643 A | * | 1/2000 | Golemon et al. | 455/63.4 |
| 6,069,912 A | * | 5/2000 | Sawahashi et al. | 375/142 |
| 6,191,736 B1 | * | 2/2001 | Yukitomo et al. | 342/383 |
| 6,570,864 B1 | * | 5/2003 | Kim et al. | 370/342 |
| 6,597,678 B1 | * | 7/2003 | Kuwahara et al. | 370/342 |
| 6,633,265 B1 | * | 10/2003 | Hirabe | 343/853 |
| 6,665,286 B1 | * | 12/2003 | Maruta et al. | 370/342 |
| 6,714,584 B1 | * | 3/2004 | Ishii et al. | 375/148 |

FOREIGN PATENT DOCUMENTS

| | | | |
|---|---|---|---|
| CN | 1169801 A | | 1/1998 |
| EP | 1 093 241 A1 | | 4/2001 |
| EP | 001249891 A2 | * | 10/2002 |
| EP | 001263151 A2 | * | 12/2002 |
| JP | 11-298345 A | | 10/1999 |
| JP | H11-284423 A | | 10/1999 |
| JP | H11-298345 A | | 10/1999 |
| JP | 2001-119337 A | | 4/2001 |
| WO | WO 01/28037 A1 | | 4/2001 |
| WO | WO 01/29989 A1 | | 4/2004 |

OTHER PUBLICATIONS

Sawahashi et al, "Experiments on Adaptive Array Diversity Transceiver for Base Station Application in W-CDMA Mobile Radio," IEEE, 2000, pp. 578-582.*

(Continued)

*Primary Examiner*—Tesfaldet Bocure
(74) *Attorney, Agent, or Firm*—Sughrue Mion, PLLC

(57) ABSTRACT

A CDMA adaptive antenna reception apparatus is provided. The apparatus includes N adaptive antenna reception sections and an initial antenna weight production section. Each of the reception sections includes an initial antenna weight selection section, which selects initial values from initial antenna weight candidates, an antenna weight control section, which adaptively controls antenna weights, and antenna weighting synthesis sections, each of which multiplies signals received by K antennae by the antenna weights and synthesizes the results of the multiplication to detect a desired signal. The initial antenna weight production section detects beam directions and null directions from antenna weights of desired signals. A null formation direction discrimination section estimates a null direction of a new desired signal, and an initial antenna weight candidate production section produces initial antenna weight candidates with which the null is formed in the estimated null direction in order to detect the new desired signal.

9 Claims, 6 Drawing Sheets

OTHER PUBLICATIONS

N. Nakaminami et al., "Performance of Coherent Adaptive Antenna Array Diversity Receiver Using the Common Antenna Weights for Rake Combined Paths for W-CDMA Reverse Link", Technical Report RCS2000-46 of the Society for the Study of the Radio Communications System, the Institute of Electronics, Information and Communication Engineers, vol. 100, No. 156, (Jun. 30, 2000), pp. 57-64.

S. Tanaka et al., "The Performance of Decision-Directed Coherent Adaptive Diversity in DS-CDMA Reverse Link", Technical Report RCS96-102 of the Society for the Study of the Radio Communications System, the Institute of Electronics, Information and Communication Engineers, vol. 96, No. 354, (Nov. 14, 1996), pp. 25-30.

* cited by examiner

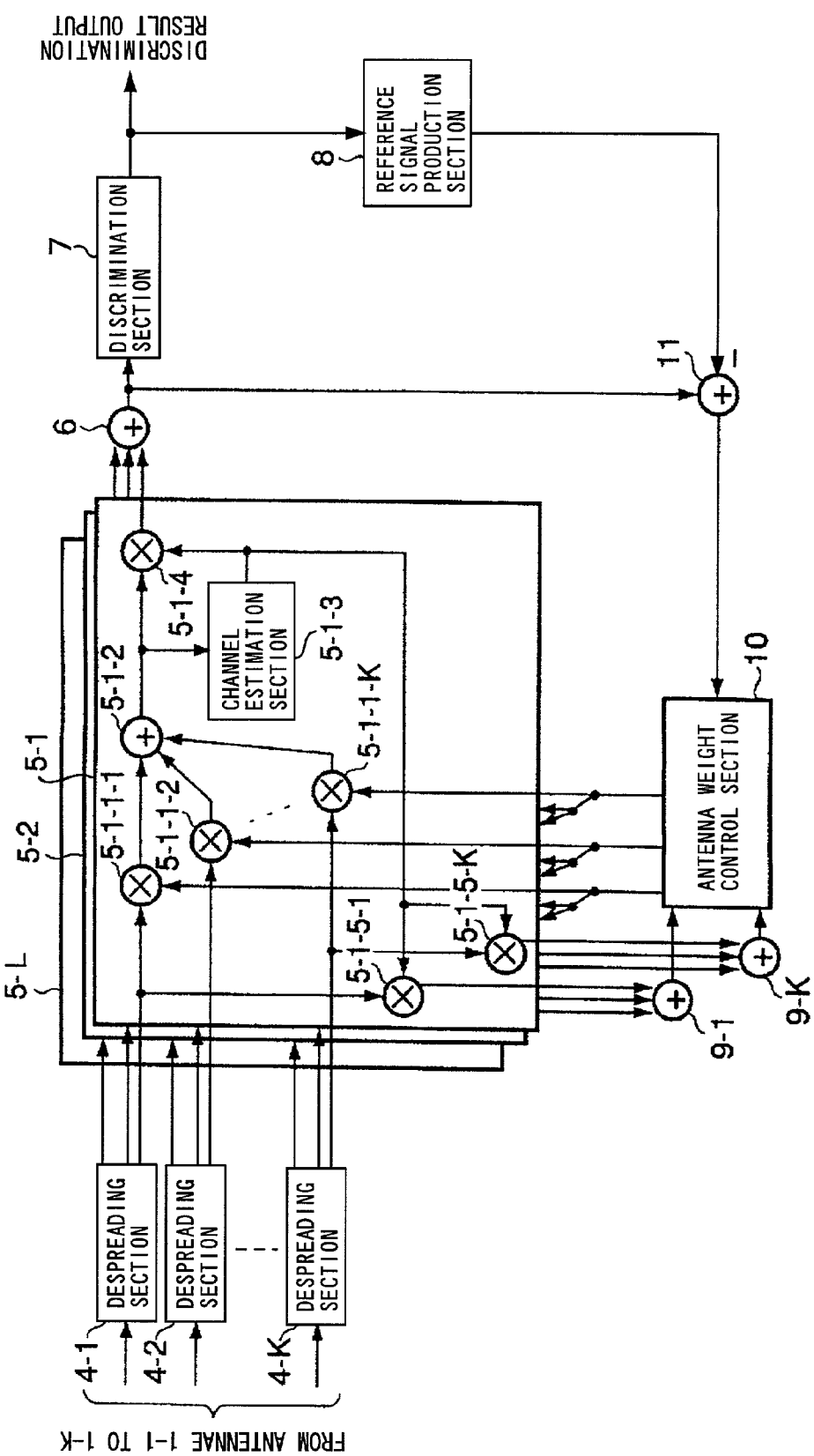

ADAPTIVE ANTENNA RECEPTION APPARATUS

BACKGROUND OF THE INVENTION

1. Field of the Invention

The present invention relates to a CDMA (Code Division Multiple Access) adaptive antenna reception apparatus, and more particularly to a CDMA adaptive antenna reception apparatus wherein the initial convergence of the antenna weight is completed at a high speed.

2. Description of the Related Art

A conventional CDMA adaptive antenna reception apparatus is disclosed, for example, in N. Nakaminami, T. Ihara, S. Tanaka and M. Sawahashi, "Performance of Coherent Adaptive Antenna Array Diversity Receiver Using the Common Antenna Weights for Rake Combined Paths for W-CDMA Reverse Link", Technical Report RCS2000-46 of the Society for the Study of the Radio Communications System, the Institute of Electronics, Information and Communication Engineers, June, 2000 or S. Tanaka, Y. Miki and M. Sawahashi, "The Performance of Decision-Directed Coherent Adaptive Diversity in DS-CDMA Reverse Link", Technical Report RCS96-102 of the Society for the Study of the Radio Communications System, the Institute of Electronics, Information and Communication Engineers, November, 1996.

The conventional CDMA adaptive antenna reception apparatus performs weighted synthesis of signals received by a plurality of antennae by adaptive control to form an optimum beam pattern which has a high directivity in an incoming direction of a desired signal and has the null of a low directivity in an incoming direction of an interference signal. The direction in which the beam pattern has a high directivity is hereinafter referred to as beam direction whereas the direction in which the beam pattern has a low directivity is hereinafter referred to as null direction.

Through the use of such a beam pattern as just described, the conventional CDMA adaptive antenna reception apparatus removes interference from a reception signal and thereby achieves an optimum reception characteristic.

FIG. 5 is a block diagram showing a configuration of a conventional CDMA adaptive antenna reception apparatus. Referring to FIG. 5, the conventional CDMA adaptive antenna reception apparatus includes K (K is an integer equal to or greater than 2) antennae 1-1 to 1-K and a number of adaptive antenna reception sections 102-1 to 102-N equal the number N (N is an integer equal to or greater than 1) of users.

The K antennae 1-1 to 1-K are disposed closely to one another so that they may have a high correlation to one another. A signal from a certain user is received by the antennae 1-1 to 1-K with phase differences caused by path differences which rely upon a relationship between incoming directions of the signal and the antenna arrangement. The antennae 1-1 to 1-K receive signals synthesized from signals from a plurality of users and interference signals such as multi-path interference signals and output the received signals to the adaptive antenna reception sections 102-1 to 102-N.

The adaptive antenna reception sections 102-1 to 102-N all have a same configuration and are allocated to the N users, that is, the first to Nth users. In other words, the CDMA adaptive antenna reception apparatus is capable of processing signals from N users simultaneously. The adaptive antenna reception sections 102-1 to 102-N process the reception signals from the users and individually output discrimination results thereof.

FIG. 6 is a block diagram showing a configuration of an adaptive antenna reception section 102-n ($1 \leq n \leq N$, n is an integer) of the conventional adaptive antenna reception apparatus. It is to be noted that the number of multi-paths is L (L is an integer equal to or greater than 1).

The adaptive antenna reception section 102-n includes K despreading sections 4-1 to 4-K, L antenna weighting synthesis sections 5-1 to 5-L, an adder 6, K adders 9-1 to 9-K, a further adder 11, a discrimination section 7, a reference signal production section 8 and an antenna weight control section 10.

The antenna weighting synthesis section 5-1 includes K multipliers 5-1-1-1 to 5-1-1-K, a multiplier 5-1-4, K multipliers 5-1-5-1 to 5-1-5-K, an adder 5-1-2 and a channel estimation section 5-1-3. All of the other antenna weighting synthesis sections 5-2 to 5-L have a configuration similar to that of the antenna weighting synthesis section 5-1.

The K despreading sections 4-1 to 4-K are connected to the K antennae 1-1 to 1-K, respectively. The despreading sections 4-1 to 4-K despread signals from the antennae 1-1 to 1-K, respectively, with a spread code allocated to the nth user to separate first path signals and output the first path signals to the L antenna weighting synthesis sections 5-1 to 5-L. The first path signals individually separated by the despreading sections 4-1 to 4-K are inputted to all of the antenna weighting synthesis sections 5-1 to 5-L.

Since the antenna weighting synthesis sections 5-1 to 5-L all have a same configuration, description is given of the antenna weighting synthesis section 5-1.

The K multipliers 5-1-1-1 to 5-1-1-K multiply the outputs of the K despreading sections 4-1 to 4-K by antenna weights outputted from the antenna weight control section 10.

The adder 5-1-2 adds outputs of the multipliers 5-1-1-1 to 5-1-1-K.

The channel estimation section 5-1-3 estimates a channel distortion from an output of the adder 5-1-2 and outputs a complex conjugate of the channel distortion to the multiplier 5-1-4 and the multipliers 5-1-5-1 to 5-1-5-K.

The multiplier 5-1-4 multiplies the output of the adder 5-1-2 and the output of the channel estimation section 5-1-3 and outputs a result of the multiplication as a demodulation signal of the first path.

The K multipliers 5-1-5-1 to 5-1-5-K are connected to the K despreading sections 4-1 to 4-K, respectively. The multipliers 5-1-5-1 to 5-1-5-K multiply the outputs of the despreading sections 4-1 to 4-K by the complex conjugate of the channel distortion outputted from the channel estimation section 5-1-3.

The antenna weighting synthesis sections 5-2 to 5-L output demodulation signals of the second to Lth paths, respectively, similarly to the antenna weighting synthesis section 5-1.

The adder 6 adds the demodulation signals of the first to Lth paths outputted from the L antenna weighting synthesis sections 5-1 to 5-L to perform RAKE synthesis.

The discrimination section 7 performs data discrimination of the signal obtained by the RAKE synthesis of the adder 6 and outputs a result of the discrimination.

The reference signal production section 8 produces a reference signal using the result of the discrimination outputted from the discrimination section 7.

The adder 11 determines an error signal between the signal obtained by the RAKE synthesis of the adder 6 and the reference signal produced by the reference signal production section 8 and outputs the error signal to the antenna weight control section 10.

The K adders 9-1 to 9-K correspond to the K antennae 1-1 to 1-K, respectively.

The adder 9-1 synthesizes the first to Lth path signals separated by the despreading section 4-1 and multiplied by complex conjugates of channel distortions by the antenna weighting synthesis sections 5-1 to 5-L and outputs a despread and path synthesis signal to the antenna weight control section 10.

The adders 9-2 to 9-K synthesize first to Lth path signals separated by the corresponding despreading sections 4-2 to 4-K and multiplied by complex conjugates of channel distortions by the antenna weighting synthesis sections 5-1 to 5-L and output despread and path synthesis signals to the antenna weight control section 10.

The antenna weight control section 110 determines antenna weights controlled to minimize the error signal determined by the adder 11 from the error signal and the despread and path synthesis signals obtained by the adders 9-1 to 9-K and outputs the antenna weights to the antenna weighting synthesis sections 5-1 to 5-L.

As an example of a control algorithm to be used by the antenna weight control section 110, the LMS (Least-Mean-Square) algorithm is available. According to the LMS algorithm, where the antenna weight of the antenna k ($2 \leq k \leq K$, k is an integer) at time t is represented by Wk(t), the error signal of the output of the adder 11 is represented by e(t) and the path synthesis signal of the kth antenna which is an output of the adder 9-K is represented by xk(t), the antenna weight is updated in accordance with the following expression (1):

$$Wk(t+1) = Wk(t) + \mu \cdot xk(t) \cdot e^*(t) \quad (1)$$

where $\mu$ is a constant called step size, and * represents a complex conjugate. While, in the conventional example described here, an antenna weight common to all of the first to Lth paths is used, antenna weights different among different paths may be produced and used.

Operation of the conventional CDMA adaptive antenna reception apparatus is described.

The conventional CDMA adaptive antenna reception apparatus shown in FIGS. 5 and 6 receives, at the K antennae 1-1 to 1-K, signals synthesized from signals from a plurality of users and interference signals with the signals from the users such as multi-path interference signals. Then, the CDMA adaptive antenna reception apparatus despread, at the despreading sections 4-1 to 4-K thereof, the signals received by the antennae 1-1 to 1-K using spread codes individually allocated to the adaptive antenna reception sections 102-1 to 102-N.

Thereafter, the CDMA adaptive antenna reception apparatus performs, at the L antenna weighting synthesis sections 5-1 to 5-L thereof, weighted synthesis of the signals obtained by despreading of the despreading sections 4-1 to 4-K with weights determined for the individual channels and further performs compensation of the synthesized signals for channel distortions. In this instance, the CDMA adaptive antenna reception apparatus performs the weighting with antenna weights controlled by the antenna weight control section 110.

Then, the CDMA adaptive antenna reception apparatus RAKE synthesizes, at the adder 6 thereof, the signals synthesized and compensated for by the antenna weighting synthesis sections 5-1 to 5-L, performs, at the discrimination section 7 thereof, data discrimination of the signal obtained by the RAKE synthesis and outputs a result of the discrimination.

In order that a desired signal can be received from whichever direction the desired signal arrives, initial values for antenna weights of a conventional CDMA adaptive antenna reception apparatus are usually set to values with which beam patterns become non-directive. Therefore, much time is required until an antenna weight converges from its initial value to a value with which a beam pattern of an optimum solution wherein the directivity is directed to the direction of a desired signal and the null is directed to the direction of an interference signal is formed.

SUMMARY OF THE INVENTION

It is an object of the present invention to provide a CDMA adaptive antenna reception apparatus which allows high speed initial convergence of an antenna weight.

In order to attain the object described above, according to the present invention, there is provided an adaptive antenna reception apparatus wherein an incoming signal is received by a plurality of antennae and the signals received by the antennae are weighted synthesized with antenna weights to detect a desired signal, comprising one or more adaptive antenna reception sections for adaptively controlling the antenna weights and for multiplying the signals received by the antennae by the antenna weights and synthesizing resulting signals of the multiplication to detect the desired signal, and an initial antenna weight production section for producing one or more initial antenna weight candidates which are candidates for an initial value to be used for the adaptive control of the antenna weights to detect a new desired signal based on antenna weights of desired signals being received which are adaptively controlled by the adaptive antenna reception section.

With the adaptive antenna reception apparatus, since adaptive control for detecting a new desired signal is started using an antenna weight or weights of an initial antenna weight candidate or candidates produced based on antenna weights of desired signals being received as an initial value or values, the adaptive control of the new desired signal can be started with the antenna weight near to a final solution and therefore converges to the final solution in a short time.

The adaptive antenna reception apparatus may be configured such that the initial antenna weight production section includes one or more beam-null direction search sections provided corresponding to the adaptive antenna reception sections for calculating beam directions and null directions of beam patterns formed with the antenna weights adaptively controlled by the adaptive antenna reception sections, a null formation direction discrimination section for discriminating a desired null direction of a beam pattern by the antenna weight for detecting the new desired signal from the beam directions and the null directions calculated by the beam-null direction search section, and an initial antenna weight candidate production section for producing the one or more initial antenna weight candidates with which beam patterns which have the null in the desired null direction obtained by the null formation direction discrimination section and have different beam directions from each other are formed, and each of the adaptive antenna reception sections starts, when the adaptive antenna reception section is allocated to the new desired signal, the adaptive control of the antenna weight using the initial antenna weight candidate whose beam direction is the incoming direction of the desired signal as an initial value.

With the adaptive antenna reception apparatus, the beam-null direction search sections calculate beam directions and null directions of the antenna weights of the desired signals being received, and the null formation direction discrimination section discriminates a desired null direction of the antenna weight of the new desired signal from the beam directions and the null directions. Further, the initial antenna weight candidate production section produces a plurality of initial antenna weight candidates modified so that the null may be formed in the desired null direction, and one of the adaptive antenna reception sections which is allocated to the new desired signal selects and uses the initial antenna weight candidate which forms the beam direction in the incoming direction of the new desired signal. Therefore, the adaptive control of the new desired signal can be started with the antenna weight whose beam direction and null direction are near to those of a final solution and therefore converges to the final solution in a short time.

The initial antenna weight candidate production section may store one or more prototypes for the antenna weight whose beam directions are different from each other and modify the null directions of the prototypes to the desired null direction obtained by the null formation direction discrimination section to produce the initial antenna weight candidates.

The null formation direction discrimination section may select, from among the null directions calculated by the beam-null direction search sections, a predetermined number of those ones with regard to which a value obtained by dividing the number of those null directions which are within a predetermined range of the null direction by the number of those ones of the beam-null direction search sections which have calculated those beam patterns whose beam directions are not within the predetermined range of the null direction has a comparatively high value to discriminate the desired null directions of the beam pattern by the antenna weight for detecting the new desired signal.

With the adaptive antenna reception apparatus, where the number of desired signals is greater than the number of the antennae and the null cannot be formed in all of incoming directions of interference signals, adaptive control for detecting a new desired signal is started using an antenna weight or weights of an initial antenna weight candidate or candidates with which a direction in which the null is comparatively likely to be formed is determined as the null direction as an initial value or values. Therefore, the adaptive control of the new desired signal can be started with the antenna weight whose beam direction and null direction are near to those of a final solution and therefore converges to the final solution in a short time.

Alternatively, the null formation direction discrimination section may select, from among the beam directions calculated by the beam-null direction search sections, a predetermined number of those ones with regard to which a value obtained by dividing the number of those null directions which are within a predetermined range of the beam direction by the number of those ones of the beam-null direction search sections which have calculated those beam patterns whose beam directions are not within the predetermined range of the beam direction has a comparatively high value to discriminate the desired null directions of the beam pattern by the antenna weight for detecting the new desired signal.

Each of the adaptive antenna reception sections may include a plurality of despreading sections corresponding to the antennae each operable for despreading one of the received signals from the antennae to separate the received signal for multi-paths and outputting a plurality of path signals, one or more first antenna weighting synthesis sections corresponding to the paths each operable for weighted synthesizing the path signals from the despreading sections with the antenna weights, performing channel estimation and compensating for a channel distortion of an antenna weighted synthesis signal and a corresponding one of the path signals, a first adder for adding the antenna weighted synthesis signals of the different paths whose channel distortions have been compensated for to RAKE synthesize the antenna weighted synthesis signals, a discrimination section for discriminating reception data from a signal obtained by the first adder, a reference signal production section for producing a reference signal from a result of the discrimination of the discrimination section, a second adder for producing an error signal which is a difference between the signal obtained by the first adder and the reference signal, an initial antenna weight selection section for selecting optimum ones of the initial antenna weight candidates as initial antenna weights based on the path signals, a plurality of third adders for adding the path signals, whose channel distortions have been compensated for by the first antenna weighting synthesis sections, for corresponding ones of the antennae to produce path synthesis signals for the corresponding antennae, and an antenna weight control section for adaptively controlling the antenna weights of the first antenna weighting synthesis sections using the initial antenna weights, the error signals and the path synthesis signal and outputting the adaptively controlled antenna weights also to the initial antenna weight production section.

Each of the first antenna weighting synthesis sections includes a plurality of first multipliers corresponding to the antennae for multiplying pass signals of a predetermined path from all of the despreading sections and the antenna weights for the path from the antenna weight control section individually for the antennae, a fourth adder for adding outputs of the first multipliers to produce the antenna weighted synthesis signal, a first channel estimation section for estimating the channel distortion from the antenna weighted synthesis signal and determining a complex conjugate of the channel distortion, a second multiplier for multiplying the antenna weighted synthesis signal and the complex conjugate of the channel distortion, and a plurality of third multipliers corresponding to the antennae for multiplying the path signals and the complex conjugate of the channel distortion individually for the antennae.

The initial antenna weight selection section may include a plurality of initial antenna weight discrimination information production sections corresponding to the initial antenna weight candidates for receiving all of the path signals from all of the despreading sections as inputs thereto, weighted synthesizing the path signals with the initial antenna weight candidates produced by the initial antenna weight production section for the individual paths, RAKE synthesizing the weighted synthesized signals for the individual paths and measuring signal to interference power ratios of the new desired signal as discrimination information, and an initial antenna weight discrimination section for selecting optimum ones of the initial antenna weight candidates based on the discrimination information.

Each of the initial antenna weight discrimination information production sections may include one or more second antenna weighting synthesizing sections corresponding to the paths for weighted synthesizing the path signals with the initial antenna weight candidates, a fifth adder for adding signals obtained by the weighted synthesis of the second antenna weighting synthesis sections to RAKE synthesize the signals, and a signal to interference power ratio measurement section for measuring a signal to interference power ratio of a signal obtained by the fifth adder.

Each of the second antenna weighting synthesis sections may include a plurality of fourth multipliers corresponding to the antennae for multiplying path signals of a predetermined path from all of the despreading sections and the initial antenna weight candidates for the path individually for the antennae, a sixth adder for adding outputs of the fourth multipliers, a second channel estimation section for estimating a channel distortion from a signal obtained by the sixth adder and determining a complex conjugate of the channel distortion, and a fifth multiplier for multiplying the signal obtained by the sixth adder and the complex conjugate of the channel distortion.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 6 is a block diagram showing a configuration of an adaptive antenna reception section of the conventional CDMA adaptive antenna reception apparatus of FIG. 5.

DESCRIPTION OF THE PREFERRED EMBODIMENT

Figure 1:
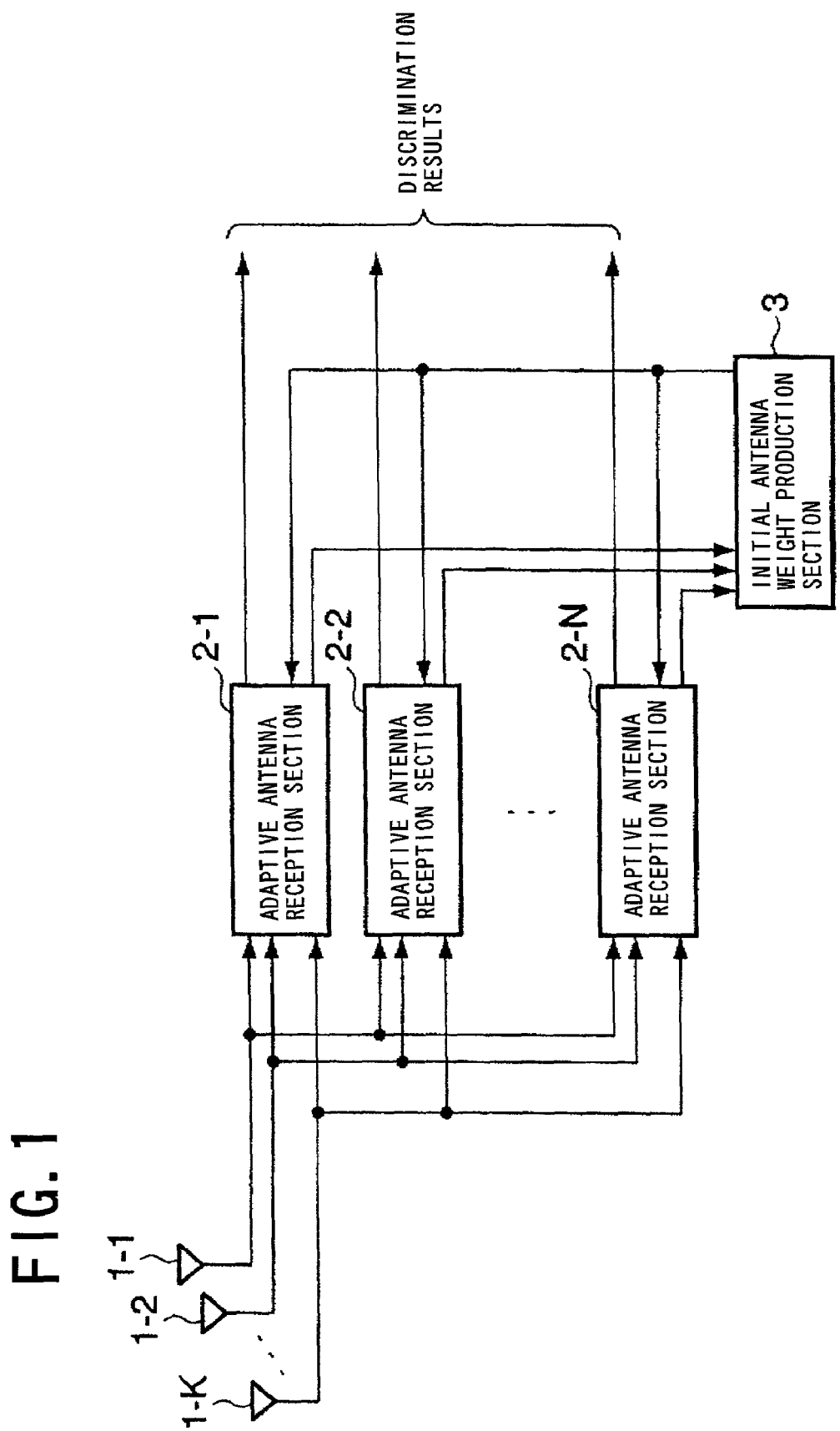
FIG. 1 is a block diagram showing a configuration of a CDMA adaptive antenna reception apparatus to which the present invention is applied.

Referring to FIG. 1, there is shown a configuration of a CDMA adaptive antenna reception apparatus to which the present invention is applied.

The CDMA adaptive antenna reception apparatus includes K (K is an integer equal to or greater than 2) antennae 1-1 to 1-K, a number of adaptive antenna reception sections 2-1 to 2-N equal to the number N (N is an integer equal to or greater than 1) of users, and an initial antenna weight production section 3.

The K antennae 1-1 to 1-K are disposed closely to one another so that they may have a high correlation to one another. A signal from a certain user is received by the antennae 1-1 to 1-K with phase differences caused by path differences which rely upon the incoming directions of the signal and the antenna arrangement. The antennae 1-1 to 1-K receive signals synthesized from signals from a plurality of users and interference signals with the signals from the users such as multi-path interference signals and output the received signals to the N adaptive antenna reception sections 2-1 to 2-N.

Figure 2:
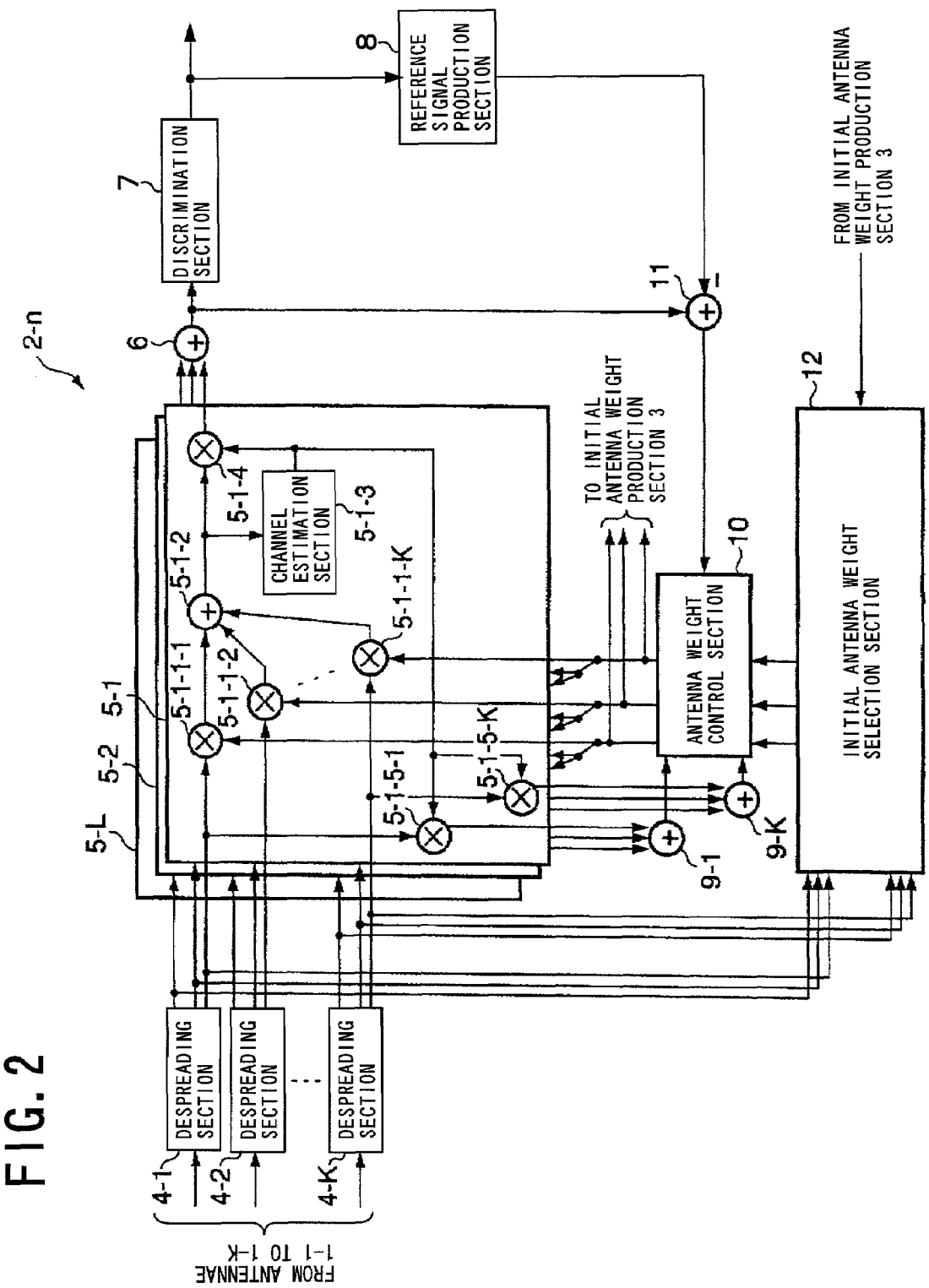
FIG. 2 is a block diagram showing a configuration of an adaptive antenna reception section of the CDMA adaptive antenna reception apparatus of FIG. 1.

FIG. 2 is a block diagram showing a configuration of the nth adaptive antenna reception section 2-n ($1 \leq n \leq N$, n is an integer) of the adaptive antenna reception apparatus of FIG. 1. It is to be noted that the number of multi-paths is L (L is an integer equal to or greater than 1).

Referring to FIG. 2, the adaptive antenna reception section 2-n includes K despreading sections 4-1 to 4-K, L antenna weighting synthesis sections 5-1 to 5-L, an adder 6, K adders 9-1 to 9-K, a further adder 11, a discrimination section 7, a reference signal production section 8, an antenna weight control section 10 and an initial antenna weight selection section 12.

The antenna weighting synthesis section 5-1 includes K multipliers 5-1-1-1 to 5-1-1-K, another multiplier 5-1-4, K multipliers 5-1-5-1 to 5-1-5-K, an adder 5-1-2 and a channel estimation section 5-1-3. The antenna weighting synthesis sections 5-2 to 5-L all have a configuration similar to that of the antenna weighting synthesis section 5-1.

The K despreading sections 4-1 to 4-K are connected to the K antennae 1-1 to 1-K, respectively. The despreading sections 4-1 to 4-K despread signals from the antennae 1-1 to 1-K with a spread code allocated to an nth user to separate first path signals and output the first path signals to the L antenna weighting synthesis sections 5-1 to 5-L. The first path signals individually separated by the despreading sections 4-1 to 4-K are inputted to all of the antenna weighting synthesis sections 5-1 to 5-L.

The L antenna weighting synthesis sections 5-1 to 5-L all have a same configuration. Therefore, description is given of the antenna weighting synthesis section 5-1 as a representative of them.

The K multipliers 5-1-1-1 to 5-1-1-K multiply outputs of the K despreading sections 4-1 to 4-K by antenna weights outputted from the antenna weight control section 10, respectively.

The adder 5-1-2 adds outputs of the K multipliers 5-1-1-1 to 5-1-1-K.

The channel estimation section 5-1-3 estimates a channel distortion from an output of the adder 5-1-2 and outputs a complex conjugate of the estimated channel distortion to the multiplier 5-1-4 and the K multipliers 5-1-5-1 to 5-1-5-K.

The multiplier 5-1-4 multiplies the output of the adder 5-1-2 and the output of the channel estimation section 5-1-3 and outputs a result of the multiplication as a demodulation signal of the first path.

The K multipliers 5-1-5-1 to 5-1-5-K are connected to the K despreading sections 4-1 to 4-K, respectively. The multipliers 5-1-5-1 to 5-1-5-K multiply the outputs of the despreading sections 4-1 to 4-K by the complex conjugate of the channel distortion outputted from the channel estimation section 5-1-3.

The antenna weighting synthesis sections 5-2 to 5-L output demodulation signals of the second to Lth paths, respectively, in a similar manner to the antenna weighting synthesis section 5-1.

The adder 6 adds the demodulation signals of the first to Lth paths outputted from the L antenna weighting synthesis sections 5-1 to 5-L to perform RAKE synthesis.

The discrimination section 7 performs data discrimination of the signal obtained by the RAKE synthesis of the adder 6 and outputs a result of the discrimination.

The reference signal production section 8 produces a reference signal using the result of the discrimination outputted from the discrimination section 7.

The adder 11 determines an error signal between the signal obtained by the RAKE synthesis of the adder 6 and the reference signal produced by the reference signal production section 8 and outputs the error signal to the antenna weight control section The K adders 9-1 to 9-K correspond to the K antennae 1-1 to 1-K, respectively. The adder 9-1 synthesizes the first to Lth path signals separated by the despreading section 4-1 and multiplied by the complex conjugates of the channel distortions by the antenna weighting synthesis sections 5-1 to 5-L and outputs a despread and path synthesis signal to the antenna weight control section 10. The adders 9-1 to 9-K all have a same configuration, and synthesize the first to Lth path signals separated by the corresponding despreading sections 4-1 to 4-K, respectively, and multiplied by the complex conjugates of the channel distortions by the antenna weighting synthesis sections 5-1 to 5-L and output respective despread and path synthesis signals to the antenna weight control section 10.

The initial antenna weight selection section 12 determines initial antenna weights from an initial antenna weight candidate from the initial antenna weight production section 3 and the outputs of the despreading sections 4-1 to 4-K.

Figure 3:
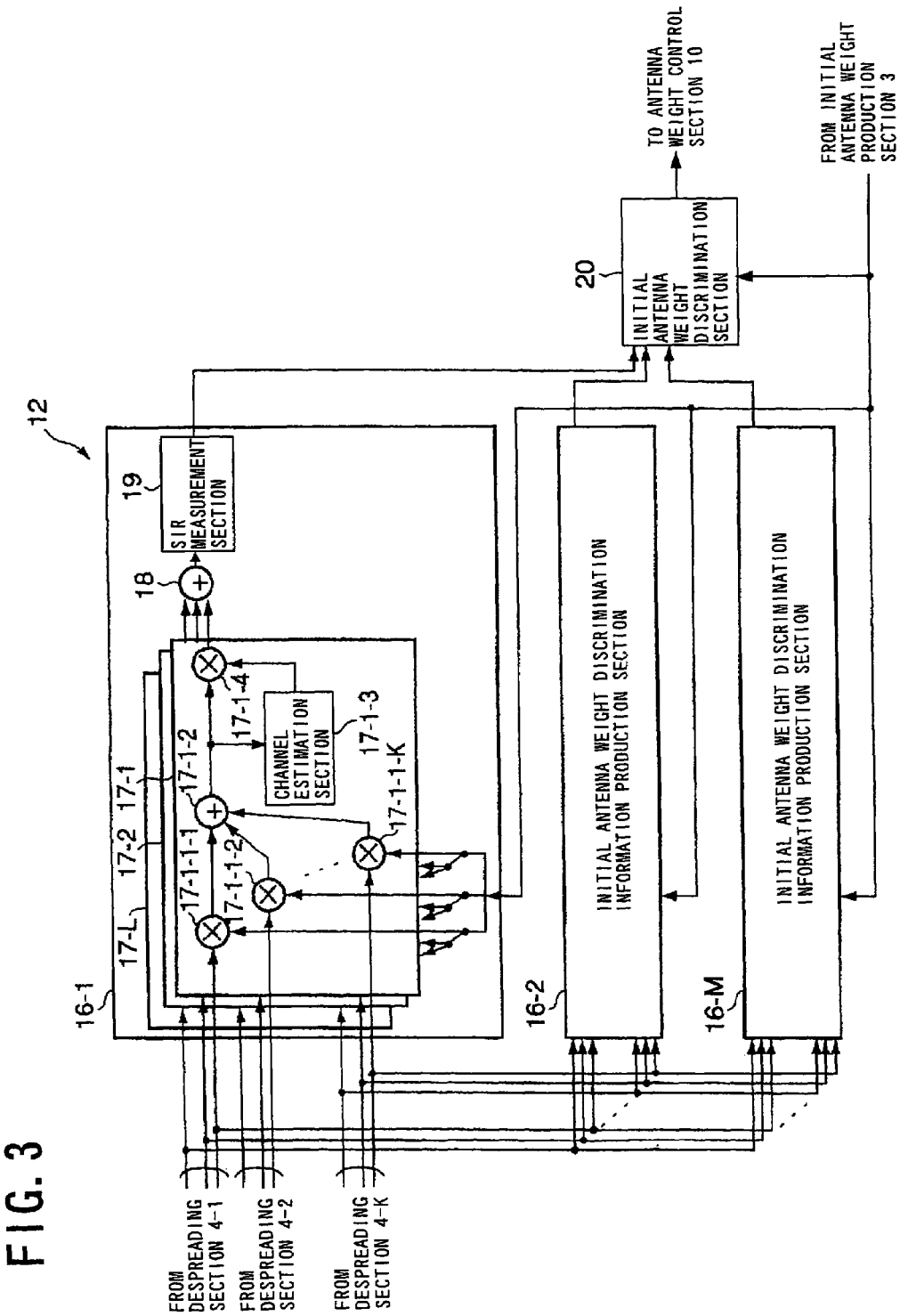
FIG. 3 is a block diagram showing a configuration of an initial antenna weight selection section shown in FIG. 2.

FIG. 3 is a block diagram showing a configuration of the initial antenna weight selection section 12 shown in FIG. 2. Referring to FIG. 3, the initial antenna weight selection section 12 includes M initial antenna weight discrimination information production sections 16-1 to 16-M and an initial antenna weight discrimination section 20.

The initial antenna weight discrimination information production section 16-1 outputs, as discrimination information, an SIR (signal to interference power ratio) obtained by weighted synthesis of outputs of the K despreading sections 4-1 to 4-K with the first initial antenna weight candidate produced by the initial antenna weight production section 3. The M initial antenna weight discrimination information production sections 16-1 to 16-M all have a same configuration and output, as discrimination information, SIRs (signal to interference power ratios) obtained by weighted synthesis of the outputs of the K despreading sections 4-1 to 4-K using the first to Nth initial antenna weight candidates produced by the initial antenna weight production section 3, respectively.

The initial antenna weight discrimination information production section 16-1 includes L antenna weighting synthesis sections 17-1 to 17-L, an adder 18 and an SIR measurement section 19.

The antenna weighting synthesis section 17-1 includes K multipliers 17-1-1-1 to 17-1-1-K, another multiplier 17-1-4, an adder 17-1-2 and a channel estimation section 17-1-3. The L antenna weighting synthesis sections 17-1 to 17-L all have a same configuration.

The multipliers 17-1-1-1 to 17-1-1-K multiply first path signals of the first to Kth antennae by the first initial antenna weight candidate.

The adder 17-1-2 adds outputs of the multipliers 17-1-1-1 to 17-1-1-K and outputs an antenna weighted synthesis signal.

The channel estimation section 17-1-3 estimates a channel distortion from the antenna weight synthesis signal and outputs a complex conjugate of the channel distortion.

The multiplier 17-1-4 multiplies the antenna weight synthesis signal and the complex conjugate of the channel distortion.

The adder 18 synthesizes outputs of the antenna weighting synthesis sections 17-1 to 17-L.

The SIR measurement section 19 measures the SIR of an output signal of the adder 18.

The initial antenna weight discrimination section 20 determines optimum initial antenna weights based on the discrimination information from the M (M is an integer equal to or greater than 1) initial antenna weight discrimination information production sections 16-1 to 16-M.

Referring back to FIG. 2, the antenna weight control section 10 controls antenna weights, for which the initial antenna weights selected by the initial antenna weight selection section 12 are used as initial values, so that the error signal determined by the adder 11 may be minimized based on the error signal and the despread and path synthesis signals obtained by the K adders 9-1 to 9-K, and outputs the antenna weights to the L antenna weighting synthesis sections 5-1 to 5-L. As an example of a control algorithm for use with the antenna weight control section 10, the LMS (Least-Mean-Square) algorithm is available.

Figure 4:
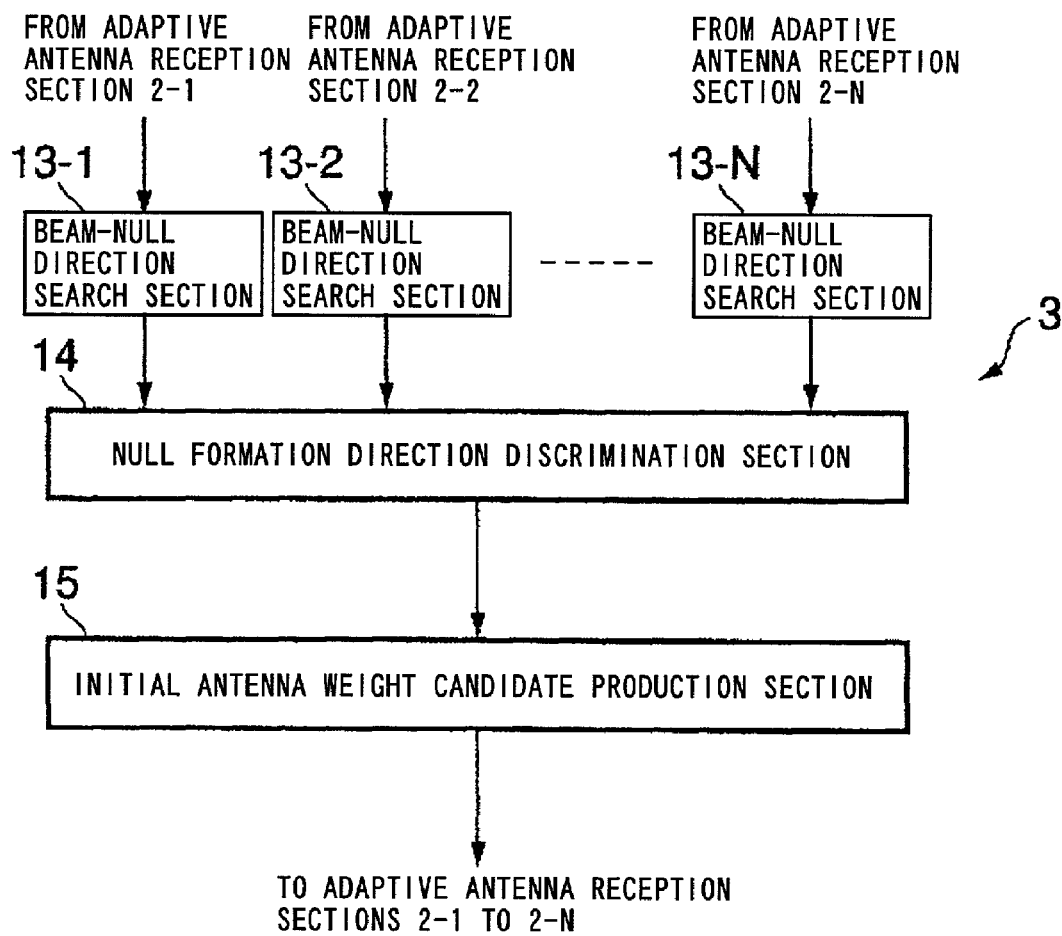
FIG. 4 is a block diagram showing a configuration of an initial antenna weight production section shown in FIG. 1.
Figure 5:
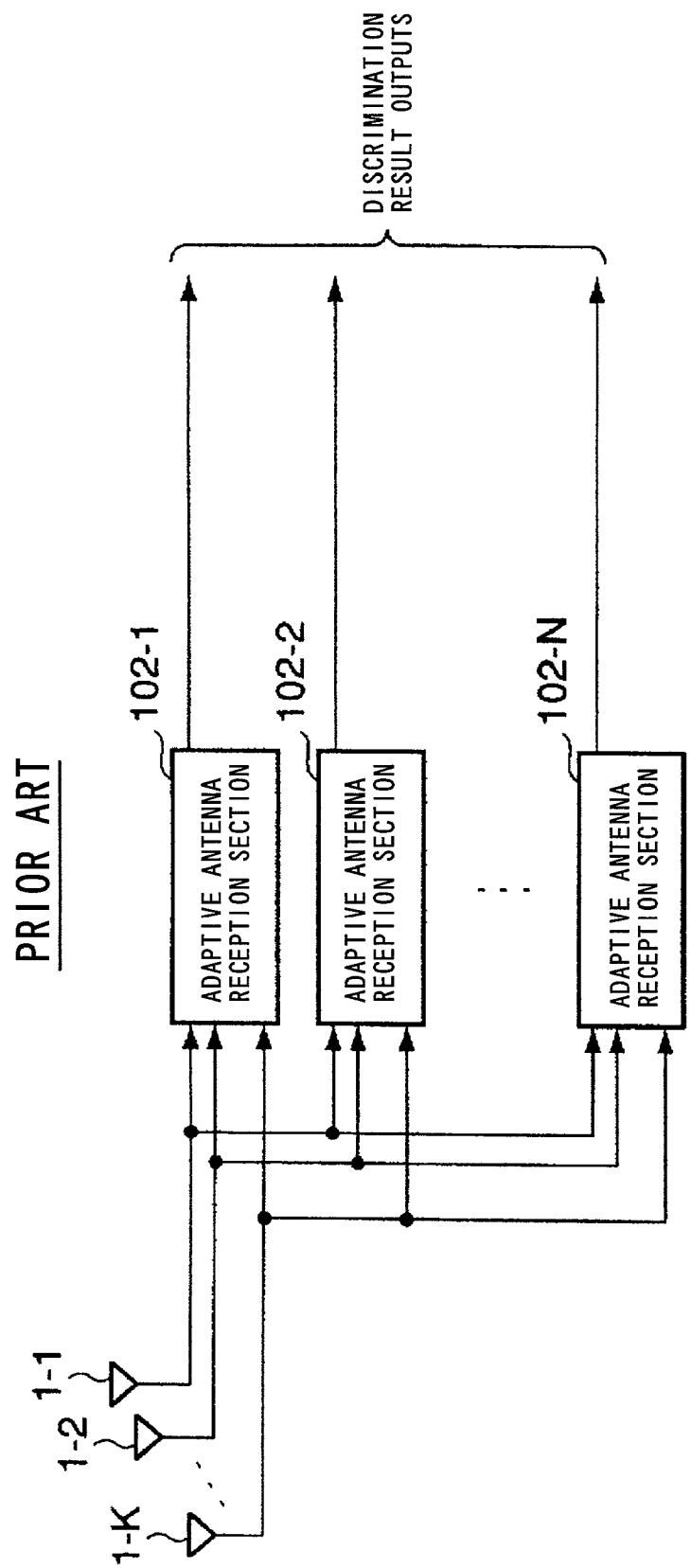
FIG. 5 is a block diagram showing a configuration of a conventional CDMA adaptive antenna reception apparatus.

FIG. 4 is a block diagram showing a configuration of the initial antenna weight production section 3 shown in FIG. 1.

Referring to FIG. 4, the initial antenna weight production section 3 includes N beam-null direction search sections 13-1 to 13-N, a null formation direction discrimination section 14 and an initial antenna weight candidate production section 15.

The N beam-null direction search sections 13-1 to 13-N form beam patterns from the antenna weights inputted thereto from the N adaptive antenna reception sections 2-1 to 2-N, respectively, and search for directive beam directions and null directions of the beam patterns to determine beam-null direction information.

The null formation direction discrimination section 14 uses the beam-null direction information determined by the N beam-null direction search sections 13-1 to 13-N to discriminate the null direction of the initial antenna weight with which the antenna weight for a new user converges as early as possible in accordance with a method which is hereinafter described.

The initial antenna weight candidate production section 15 stores in advance M (M is an integer equal to or greater than 1) prototypes of the antenna weight for different beam directions from one another. Then, the initial antenna weight candidate production section 15 replaces, based on the null formation direction obtained by the null formation direction discrimination section 14, the null direction of a prototype in accordance with a method which is hereinafter described to produce an initial antenna weight candidate. Where the initial antenna weight candidate produced in this manner is allocated to the new user and used as an initial value for the antenna weight, formation of the null through adaptive control converges in a short time.

Operation of the CDMA adaptive antenna reception apparatus having the configuration described above is described.

When the ith user ($1 \leq i \leq N$) is communicating, the adaptive antenna reception section 2-i controls the antenna weight so that a beam pattern having a directivity in an incoming direction of a user i signal may be formed. Accordingly, from the antenna weight of the user who is communicating, the incoming direction of the signal, that is, the incoming direction signal of a signal which may possibly interfere with a signal of a new user can be estimated.

When the initial antenna weight production section 3 produces an initial antenna weight candidate for a new user j ($1 \leq j \leq N$, $i \neq j$), it produces an initial antenna weight candidate guaranteed to remove interference of a signal incoming from an estimated direction in advance from an antenna weight of a user who is communicating.

When the initial antenna weight production section 3 produces an initial antenna weight candidate for a new user, the beam formation direction and the null direction are determined from the antenna weight of the ith user by the beam-null direction search section 13-i. The beam-null direction search section 13-i calculates a product G of a response vector R which depends upon the geometrical arrangement of the antennae 1-1 to 1-K and the signal incoming direction and an antenna weight vector W determined based on the inputted antenna weight. The response vector here is a vector representative of a reception phase difference between antennas which depends upon a relationship between the geometrical arrangement of the antennae 1-1 to 1-K and the signal incoming direction.

The beam-null direction search section 13-i successively calculates the product G while successively changing the signal incoming direction to vary the response vector R, and determines the direction with which the product G exhibits a maximum value as the beam direction and determines the direction with which the product G exhibits a minimum value as the null direction.

It is to be noted that, while it is estimated that the beam directions of those users who are communicating be interference directions to a new user, the adaptive antenna can produce only a number of nulls equal to the number of antenna elements−1 (=K−1). Since generally the number of users is greater than the number of antenna elements, it is in most cases impossible to produce the null for the directions of all users who are communicating. Accordingly, even if the antenna weight of a certain user forms the null in a direction, the antenna weight of another user does not necessarily form the null in the same direction. However, the null is likely to be produced preferentially in such a direction of a high electric power signal or a direction in which a plurality of signals are crowded that significant interference is caused.

In particular, it is considered that the antenna weights of many users form the null in the directions mentioned above with a high possibility and also the antenna weight of a new user is adaptively controlled so as to form the null in the directions with a high possibility.

The null formation direction discrimination section 14 determines redundancies as priorities regarding the null direction of the user and selects the priorities in a descending order of the redundancies. For example, if the null direction of a certain user is determined as a reference direction and some other users form the null within the range of reference direction $\pm\Delta\theta$, then the directions are added one by one, and a result of the addition is divided by the number of the users except those users whose beams are formed within the range of the reference direction $\pm\Delta\psi$. A resulting value of the division may be used as the redundancy. Further, for example, the direction of the beam of a user who is communicating may be used as the reference direction.

The null formation direction discrimination section 14 outputs the reference direction determined in such a manner as described above as a null formation direction to the new user to the initial antenna weight candidate production section 15. At this time, the null formation direction discrimination section 14 outputs only a direction with regard to which the redundancy is higher than a certain threshold value as the full formation direction. Further, where more than K-1 directions with regard to which the redundancy is higher than the threshold value are available, those K-1 directions which have comparatively high redundancies from among the directions are outputted in order as null formation directions.

M (M is an integer equal to or greater than 1) prototypes for the antenna weight whose beam directions are different from one another are set in advance in the initial antenna weight candidate production section 15. The prototypes for the antenna weight are determined, for example, as complex conjugations of individual factors of response vectors to the directions in which the beam is directed. Further, the null direction of each of the prototypes for the antenna weight is known in advance by determining a response vector whose product with the antenna weight vector is 0.

The initial antenna weight candidate production section 15 replaces the null directions of the prototypes for the antenna weight in accordance with the null formation direction information from the null formation direction discrimination section 14. In this instance, however, if a null formation direction from the null formation direction discrimination section 14 is in the proximity of the beam direction of a prototype, then the initial antenna weight candidate production section 15 does not replace the null direction of the prototype. Further, the initial antenna weight candidate production section 15 selects and replaces that one of the original null directions of the prototypes which is nearest to the null formation direction from the null formation direction discrimination section 14.

The null directions of the prototypes for the antenna weight are replaced to reconstruct antenna weights in this manner, and the antenna weights thus reconstructed are used as initial antenna weight candidates. Referring to FIG. 3, the initial antenna weight candidates are inputted to the M initial antenna weight discrimination information production sections 16-1 to 16-M and the initial antenna weight discrimination section 20.

The M initial antenna weight discrimination information production sections 16-1 to 16-M perform weighted synthesis of the despread signals from the K despreading sections 4-1 to 4-K using the first to Nth initial antenna weight candidates to measure SIRs of the despread signals and output the SIRs as discrimination information to the initial antenna weight discrimination section 20. The initial antenna weight discrimination section 20 selects that one of the initial antenna weight candidates which has the best SIR based on the discrimination information inputted thereto from the M initial antenna weight discrimination information production sections 16-1 to 16-M. Then, the initial antenna weight discrimination section 20 outputs the selected initial antenna weight candidate as an initial antenna weight to the antenna weight control section 10.

Referring to FIG. 2, the antenna weight control section 10 starts the adaptive control of the antenna weight using the initial antenna weight from the initial antenna weight discrimination section 20 as an initial value.

In the CDMA adaptive antenna reception apparatus, the N beam-null direction search sections 13-1 to 13-N determine the beam directions and the null directions of the antenna weights of users who are communicating, and the null formation direction discrimination section 14 discriminates the null direction of the antenna weight of a new user from the beam directions and the null directions. Then, the initial antenna weight candidate production section 15 produces a plurality of initial antenna weight candidates modified so that the null may be formed in the null direction, and the adaptive antenna reception section 2-j allocated to the new user selects and uses one of the initial antenna weight candidates with which the beam direction is formed in the signal incoming direction of the new user. Therefore, the beam direction substantially coincides with the signal incoming direction. Besides, a beam pattern which has the null in a direction in which it is estimated to form the null finally is formed at the point of time of an initial stage, and, through the adaptive control, the antenna weight converges to an optimum solution in a short time.

It is to be noted that, while the adaptive antenna reception apparatus described above is configured such that a common antenna weight is used for all of paths of the same user, the present invention can be applied also to another CDMA adaptive antenna reception apparatus wherein antenna weights different among different paths are used.

Further, while the foregoing description is directed to a typical example wherein the present invention is applied to a CDMA reception apparatus, the present invention can be applied also to a reception apparatus of any radio communication system wherein a plurality of incoming signals are received by a plurality of antennae and weighted synthesized.

While a preferred embodiment of the present invention has been described using specific terms, such description is for illustrative purposes only, and it is to be understood that changes and variations may be made without departing from the spirit or scope of the following claims.

What is claimed is:

1. An adaptive antenna reception apparatus wherein an incoming signal is received by a plurality of antennae and the signals received by said antennae are weighted synthesized with antenna weights to detect a desired signal, comprising:
    one or more adaptive antenna reception sections for adaptively controlling the antenna weights and for multiplying the signals received by said antennae by the antenna weights and synthesizing resulting signals of the multiplication to detect the desired signal; and
    an initial antenna weight production section for producing one or more initial antenna weight candidates which are candidates for an initial value to be used for the adaptive control of the antenna weights to detect a new desired signal based on antenna weights of desired signals being received which are adaptively controlled by said adaptive antenna reception section,
    wherein said initial antenna weight production section includes one or more beam-null direction search sections provided corresponding to said adaptive antenna reception sections for calculating beam directions and null directions of beam patterns formed with the antenna weights adaptively controlled by said adaptive antenna reception sections, a null formation direction discrimination section for discriminating a desired null direction of a beam pattern by the antenna weight for detecting the new desired signal from the beam directions and the null directions calculated by said beam-null direction search section, and an initial antenna weight candidate production section for producing the one or more initial antenna weight candidates with which beam patterns which have the null in the desired null direction obtained by said null formation direction discrimination section and have different beam directions from each other are formed, and each of said adaptive antenna reception sections starts, when the adaptive antenna reception section is allocated to the new desired signal, the adaptive control of the antenna weight using the initial antenna weight candidate whose beam direction is the incoming direction of the desired signal as an initial value.

2. An adaptive antenna reception apparatus as claimed in claim 1, wherein said initial antenna weight candidate production section stores one or more prototypes for the antenna weight whose beam directions are different from each other and modifies the null directions of the prototypes to the desired null direction obtained by said null formation direction discrimination section to produce the initial antenna weight candidates.

3. An adaptive antenna reception apparatus as claimed in claim 1, wherein said null formation direction discrimination section selects, from among the null directions calculated by said beam-null direction search sections, a predetermined number of those ones with regard to which a value obtained by dividing the number of those null directions which are within a predetermined range of the null direction by the number of those ones of said beam-null direction search sections which have calculated those beam patterns whose beam directions are not within the predetermined range of the null direction has a comparatively high value to discriminate the desired null directions of the beam pattern by the antenna weight for detecting the new desired signal.

4. An adaptive antenna reception apparatus as claimed in claim 1, wherein said null formation direction discrimination section selects, from among the beam directions calculated by said beam-null direction search sections, a predetermined number of those ones with regard to which a value obtained by dividing the number of those null directions which are within a predetermined range of the beam direction by the number of those ones of said beam-null direction search sections which have calculated those beam patterns whose beam directions are not within the predetermined range of the beam direction has a comparatively high value to discriminate the desired null directions of the beam pattern by the antenna weight for detecting the new desired signal.

5. An adaptive antenna reception apparatus as claimed in claim 1, wherein each of said adaptive antenna reception sections includes:
    a plurality of despreading sections corresponding to said antennae each operable for despreading one of the received signals from said antennae to separate the received signal for multi-paths and outputting a plurality of path signals;
    one or more first antenna weighting synthesis sections corresponding to the paths each operable for weighted synthesizing the path signals from said despreading sections with the antenna weights, performing channel estimation and compensating for a channel distortion of an antenna weighted synthesis signal and a corresponding one of the path signals;
    a first adder for adding the antenna weighted synthesis signals of the different paths whose channel distortions have been compensated for to RAKE synthesize the antenna weighted synthesis signals;
    a discrimination section for discriminating reception data from a signal obtained by said first adder;
    a reference signal production section for producing a reference signal from a result of the discrimination of said discrimination section;
    a second adder for producing an error signal which is a difference between the signal obtained by said first adder and the reference signal;
    an initial antenna weight selection section for selecting optimum ones of the initial antenna weight candidates as initial antenna weights based on the path signals;
    a plurality of third adders for adding the path signals, whose channel distortions have been compensated for by said first antenna weighting synthesis sections, for corresponding ones of said antennae to produce path synthesis signals for the corresponding antennae; and
    an antenna weight control section for adaptively controlling the antenna weights of said first antenna weighting synthesis sections using the initial antenna weights, the error signals and the path synthesis signal and outputting the adaptively controlled antenna weights also to said initial antenna weight production section.

6. An adaptive antenna reception apparatus as claimed in claim 5, wherein each of said first antenna weighting synthesis sections includes:
- a plurality of first multipliers corresponding to said antennae for multiplying pass signals of a predetermined path from all of said despreading sections and the antenna weights for the path from said antenna weight control section individually for said antennae;
- a fourth adder for adding outputs of said first multipliers to produce the antenna weighted synthesis signal;
- a first channel estimation section for estimating the channel distortion from the antenna weighted synthesis signal and determining a complex conjugate of the channel distortion;
- a second multiplier for multiplying the antenna weighted synthesis signal and the complex conjugate of the channel distortion; and
- a plurality of third multipliers corresponding to said antennae for multiplying the path signals and the complex conjugate of the channel distortion individually for said antennae.

7. An adaptive antenna reception apparatus as claimed in claim 5, wherein said initial antenna weight selection section includes:
- a plurality of initial antenna weight discrimination information production sections corresponding to the initial antenna weight candidates for receiving all of the path signals from all of said despreading sections as inputs thereto, weighted synthesizing the path signals with the initial antenna weight candidates produced by said initial antenna weight production section for the individual paths, RAKE synthesizing the weighted synthesized signals for the individual paths and measuring signal to interference power ratios of the new desired signal as discrimination information; and
- an initial antenna weight discrimination section for selecting optimum ones of the initial antenna weight candidates based on the discrimination information.

8. An adaptive antenna reception apparatus as claimed in claim 7, wherein each of said initial antenna weight discrimination information production sections includes:
- one or more second antenna weighting synthesizing sections corresponding to the paths for weighted synthesizing the path signals with the initial antenna weight candidates;
- a fifth adder for adding signals obtained by the weighted synthesis of said second antenna weighting synthesis sections to RAKE synthesize the signals; and
- a signal to interference power ratio measurement section for measuring a signal to interference power ratio of a signal obtained by said fifth adder.

9. An adaptive antenna reception apparatus as claimed in claim 8, wherein each of said second antenna weighting synthesis sections includes:
- a plurality of fourth multipliers corresponding to said antennae for multiplying path signals of a predetermined path from all of said despreading sections and the initial antenna weight candidates for the path individually for said antennae;
- a sixth adder for adding outputs of said fourth multipliers;
- a second channel estimation section for estimating a channel distortion from a signal obtained by said sixth adder and determining a complex conjugate of the channel distortion; and
- a fifth multiplier for multiplying the signal obtained by said sixth adder and the complex conjugate of the channel distortion.

* * * * *